UNITED STATES PATENT OFFICE.

FRANCIS EMILE BUCHER, OF SPANISH TOWN, JAMAICA.

PROCESS OF TREATING LOGWOOD EXTRACTS.

SPECIFICATION forming part of Letters Patent No. 637,707, dated November 21, 1899.

Application filed January 6, 1898. Serial No. 665,846. (No specimens.)

*To all whom it may concern:*

Be it known that I, FRANCIS EMILE BUCHER, a citizen of the Republic of Switzerland, residing in Spanish Town, in the parish of St. Catherine, county of Middlesex, Jamaica, have invented an Improved Method of Obtaining Extract of Logwood, of which the following is a specification.

It is known that in many applications of logwood or extracts from logwood hæmatein ($C_{16}H_{12}O_6$) gives much superior results to hæmatoxylin, ($C_{16}H_{14}O_6$.) It has been held that in order to obtain the colored pigments characteristic of logwood a process of oxidation must invariably take place, either during the dyeing process, in which case the oxygen would, as a rule, be supplied by the mordant, or previously to the dyeing process, where hæmatoxylin is converted into hæmatein. In the case of logwood chips an oxidation is attained by the well-known process of curing or aging. This process is tedious, cumbersome, and often wasteful. Several patents have been granted for chemical processes devised for oxidizing liquors or extracts from logwood. Among the chemical agents used in such processes were solution of bleaching powder, hypochlorous acid, chloric acid, chlorates or nitrates of the alkalies and alkaline earths, and chlorine as a gas or in solution. My invention effects in a practical manner the conversion of hæmatoxylin into hæmatein more smoothly than is possible by any other known practical means.

I have found that the oxides of nitrogen, richer in oxygen than deutoxide of nitrogen, (NO,) when allowed to react upon hæmatoxylin convert it into hæmatein. I find that fifty grams peroxide of nitrogen ($NO_2$) or eighty grams trioxide of nitrogen ($N_2O_3$) conducted slowly in a vaporized form into a solution of one hundred grams hæmatoxylin in two liters of water at ordinary temperature convert the hæmatoxylin effectively into hæmatein. In practice I use peroxide of nitrogen ($NO_2$) in a gaseous form, as it is readily obtained either as such or by the reaction of air upon either deutoxide of nitrogen (NO) or trioxide of nitrogen, ($N_2O_3$.) Before applying my process to a liquor or extract from logwood I determine by a preliminary trial what proportion of the peroxide of nitrogen to the liquor or extract is required to obtain the desired proportion of hæmatein in the final liquor or extract. This quantity of peroxide will naturally depend upon the quantity of hæmatoxylin contained in the liquor or extract to be treated and also upon the proportion of hæmatein that may be desired.

I have found that in practice the following process gives an extract of logwood whose coloring principle consists almost entirely of hæmatein. The gases, mainly vapor from nitrogen trioxide and peroxide of nitrogen, obtained by the decomposition of seventy pounds of nitric acid of 80° Twaddell by means of twenty pounds of sugar at 80° centigrade are brought into contact with a powerful current of air and, thus diluted, are led into one thousand pounds of extract of 20° Twaddell obtained from non-cured logwood, the extract being kept at ordinary temperature. This current, which converts the vapor from trioxide of nitrogen into peroxide, besides beneficially diluting the reacting gas—namely, peroxide of nitrogen—agitates the extract, thereby causing the peroxide to react evenly and gradually upon the extract. Most of the hæmatein formed, it being sparely soluble, precipitates. During the process some nitric acid is formed as a by-product. To neutralize it, I add fifty pounds of soda-ash dissolved in water. The product may then be used as such or concentrated.

I do not limit myself to any particular mode of production of the oxides of nitrogen, nor to the given proportion of them to the extract to be treated, nor to the given concentration of the extract. The mode of production of oxides of nitrogen, the proportion, and the concentration hereinbefore mentioned merely serve as an example to enable a person skilled in the art of chemical manufacture to carry out my invention. Nor is the temperature at which the operation is carried on of great importance. I find that keeping the extract at ordinary temperature during the reaction answers the purpose very well. The principle of my invention, for which I claim protection, is the conversion of hæmatoxylin into hæmatein by the oxides of nitrogen richer in oxygen than deutoxide of nitrogen or a mixture of them.

I claim—

The herein-described improvement in the treatment of liquors or extracts from logwood containing hæmatoxylin in solution, consisting in conducting vapors of peroxide of nitrogen, preferably diluted with air, through such liquors or extracts, whereby hæmatoxylin is converted into hæmatein, substantially as described.

In testimony whereof I have signed my name to this specification in the presence of two subscribing witnesses.

FRANCIS EMILE BUCHER.

Witnesses:
ALLAN K. ALEXANDER,
HUBERT HOWSON.